Figure 1:
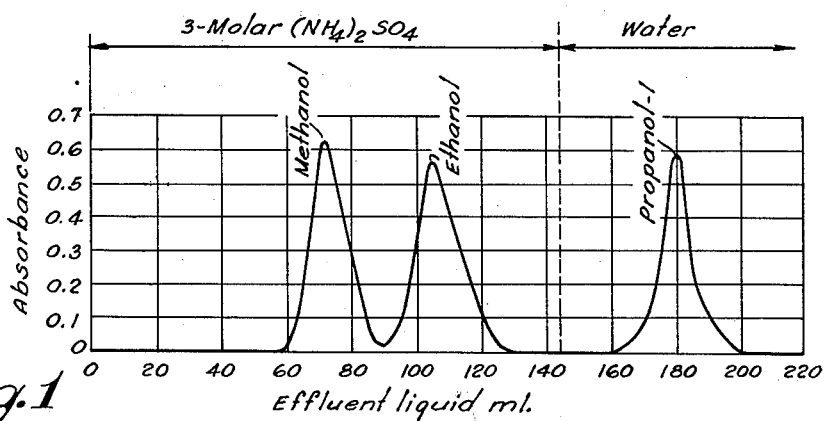

May 26, 1964  R. N. SARGENT ETAL  3,134,814
METHOD OF SEPARATING NON-IONIZED ORGANIC SOLUTES
FROM ONE ANOTHER IN AQUEOUS SOLUTION
Filed May 9, 1957

INVENTORS.
Roger N. Sargent
Caspar William Rieman III

BY Griswold & Burdick
ATTORNEYS

United States Patent Office 3,134,814
Patented May 26, 1964

3,134,814
METHOD OF SEPARATING NON-IONIZED ORGANIC SOLUTES FROM ONE ANOTHER IN AQUEOUS SOLUTION
Roger N. Sargent and Caspar William Rieman III, New Brunswick, N.J., assignors to The Dow Chemical Company, Midland, Mich., a corporation of Delaware
Filed May 9, 1957, Ser. No. 658,086
10 Claims. (Cl. 260—583)

This invention concerns a method of separating non-ionized or weakly ionized water-soluble organic compounds from one another in aqueous electrolyte solutions with ion exchange resins.

It is known that non-ionized or weakly ionized water-soluble organic compounds can be absorbed on water-immersed ion exchange resins and eluated therefrom by washing the resin with water. U.S. Patent No. 2,684,331 discloses a method of separating non-ionized or lowly-ionized organic compounds from highly ionized compounds wherein a given quantity of an aqueous solution of the solutes to be separated is fed to a water-immersed bed of an ion exchange resin having an ion identical with an ion of the highly ionized solute, thus displacing from the bed an equal quantity of water, then feeding water to the bed and displacing a further quantity of effluent liquid and collecting successive fractions of the displaced effluent liquid, whereby there is obtained a fraction of the effluent liquid containing the highly ionized solute and a subsequent fraction containing a major portion of the non-ionized or weakly ionized solute as substantially the sole solute in said fraction. The method is effective for separating non-ionzied or weakly ionized solutes from highly ionized solutes in aqueous solutions, e.g. for separating glycerol from sodium chloride in aqueous solution.

However, the separation of non-ionized or weakly-ionized water-soluble organic compounds such as the separation of alcohols, glycols, ketones, aldehydes, amines or mixtures of such compounds or wood distillation products, e.g. lignins, from one another, is far more difficult to accomplish, and such compounds, particularly adjacent homologues of such compounds of the same or related series, have not heretofore been readily separated from one another in an aqueous solution by selective absorption on, and elution from, ion exchange resins.

It has now been found that non-ionized or weakly-ionized water-soluble organic compounds such as alcohols, glycols, ketones, aldehydes, amines or lignins can readily be separated from one another in an aqueous electrolyte solution by a procedure which involves feeding a quantity of an aqueous solution of the solutes to be separated into contact with a bed of an ion exchange resin immersed in an aqueous solution, preferably an aqueous electrolyte or inorganic salt solution, and thereby displacing from the bed an equal quantity of effluent liquid, then feeding to the bed an aqueous solution of an electrolyte such as an inorganic salt, as hereinafter defined, to displace a further quantity of effluent liquid from the bed, and collecting successive fractions of the displaced effluent liquid, whereby there is obtained a fraction of the effluent liquid consisting essentially of the electrolyte solution containing a major portion of a single organic compound as the sole organic solute and subsequent fractions of effluent liquid consisting essentially of aqueous liquid containing the electrolyte and a major portion of another of the organic compounds as the sole organic solute, until each of the organic compounds has been eluted from the resin and displaced from the bed in the effluent liquor, then feeding a further quantity of the aqueous solution of the solutes to be separated to the bed, and repeating the sequence of operations.

It has been discovered that by feeding an aqueous solution of an inorganic salt, as hereinafter defined, to the bed of the ion exchange resin, after feed to, and contact of the aqueous solution of the organic compounds to be separated with, the bed of the ion exchange resin, the aqueous inorganic salt solution causes a salting-out of the organic compounds and effects a selective absorption and elution action of the organic compounds with the ion exchange resin and results in separating the compounds from one another within the bed and displacement from the bed of said organic compounds in different portions of the effluent liquid. By collecting successive fractions of the displaced effluent liquid from the bed of the ion exchange resin there are obtained fractions of the inorganic salt solution each containing a major portion of an organic compound as the sole or principal organic solute in said fraction. Thus, the organic compounds are separated from one another.

A considerable number and variety of ion exchange resins, both cation exchange resins and anion exchange resins, which can be employed in the process are known, it being necessary that the ion exchange resin immersed in the aqueous liquid be capable of absorbing the non-ionized or weakly ionized organic solutes and not in a form chemically reactive with said organic compounds.

Examples of suitable cation exchange resins are the sulfonated copolymers of monovinyl aromatic hydrocarbons such as are disclosed in U.S. Patent No. 2,366,007. The cation exchange resins can be employed in their acidic or hydrogen form or their salt form. The preferred form being dependent upon the kind of electrolyte or inorganic salt employed in the aqueous solution used to wash or elute the organic compounds from the bed of the resin.

The cation exchange resins are preferably nuclear sulfonated insoluble copolymers of one or more polymerizable monoalkenyl aromatic hydrocarbons, e.g. styrene, vinyltoluene or ar-ethylvinylbenzene, with a minor amount, suitably from 2 to 10 percent by weight of the copolymer, of divinylbenzene. Such cation exchange resins in their acidic or hydrogen form are strongly ionized such that the addition of a 10 gram portion thereof of 100 cubic centimeters of a 0.1 normal aqueous sodium chloride solution brings the latter to a pH valve of 3 or lower.

Examples of anion exchange resins which may be employed in the process of the invention are the strongly basic quaternary ammonium anion exchange resins such as are disclosed in U.S. Patents Nos. 2,591,573 and 2,614,099. The anion exchange resins may be employed in their basic or hydroxide form or in their salt form, the latter form being dependent upon the kind of inorganic salt employed in the aqueous solution used to elute the organic compounds from the bed of the resin. The quaternary ammonium anion exchange resins in their basic or hydroxide form are strongly ionized such that the addition of a 10 gram portion thereof to 100 cubic centimeters of a 0.1 normal aqueous solution of sodium chloride brings the latter to a pH value of 11 or higher.

The aforementioned ion exchange resins readily absorb organic compounds such as lower alkyl alcohols, glycols, glycerol, amines, ketones, aldehydes or lignins when dissolved as solutes in aqueous liquids.

The electrolyte or inorganic salt to be employed in the process for effecting the separation of the organic compounds from one another must be appreciably soluble in water, have a substantial salting-out effect for the organic solute and be inert or non-reactive with the organic solutes to be separated. The salting-out effect depends in part upon the nature of the ions, see Z. physik. Chem., vol. 153, p. 299 (1931). Examples of suitable electrolytes or inorganic salts are ammonium sulfate, ammonium chloride, ammonium bromide, sodium chloride, potassium chloride, sodium sulfate, potassium sulfate, sodium bromide, sodium borate, potassium phosphate, calcium chloride, barium chloride, magnesium sulfate, aluminum sulfate, aluminum chloride, etc. The inorganic salt can be used in any desired concentration corresponding to from a 0.1 normal aqueous solution of the salt in water up to a saturated or substantially saturated aqueous solution of the salt, preferably a from 0.1 to 4-molar solution.

It may be mentioned that for the separation of amines from one another, best results are usually obtained employing an aqueous solution of a basic salt, e.g. an aqueous solution of potassium phosphate.

The process can be carried out at temperatures between 0° and 100° C., preferably from 20° to 85° C., and is conveniently carried out at room temperature or thereabout.

In practice, a bed of a granular ion exchange resin is flooded with water or the aqueous inorganic salt solution used as eluant. Thereafter, an equeous solution of the organic compounds of the kind to be separated from one another is fed slowly to the bed so as to displace an equal volume of liquid from the bed. The resultant flow of liquid through the bed may be in any direction, but is preferably either upward or downward. This flow should be quite slow so as to avoid as far as possible commingling of the solution with the liquid which is being flushed from the bed. The volume of the solutin fed to the bed is preferably, but not necessarily, less than the volume of water surrounding the resin granules in the bed. Upon contact with the feed solution, the resin absorbs the organic solutes, and in most instances with some degree of difference, depending in part upon the kind of organic solutes in the feed solution, their molecular sizes, the rates at which the molecules diffuse through the resin granules and the salting-out effect of the electrolyte in the aqueous liquid surrounding the resin granules. The organic solutes thus become absorbed in the aqueous liquid within the resin granules and are distributed in the bed of the resin as bands or levels which may be the same or different for one or more of the organic solutes. The liquid surrounding the resin granules and from which the organic solutes have been absorbed is then flushed from the bed by an inflow of an aqueous solution of the electrolyte. The flow of the electrolyte solution is continued, to extract the absorbed organic solute from the resin granules and wash the desorbed material, i.e. the extracted solute, from the bed of the resin. Because of the differences in the solubilities of the organic solutes in the aqueous electrolyte solution due to the salting-out effect of the electrolyte, the organic solutes are extracted or eluted from the resin granules at rates which are different from one another and are displaced from the bed in different portions of the effluent liquid.

During passage of the aqueous liquids, i.e. the starting solution and subsequently the electrolyte or inorganic salt solution, through the bed of the ion exchange resin, there are collected as successive fractions of the effluent liquid: (a) aqueous liquid or inorganic salt solution flushed from the bed of the ion exchange resin; (b) a fraction containing the electrolyte and rich in the organic solute which is first to be eluted from the bed of the ion exchange resin with the solution; (c) usually but not always, an intermediate aqueous fraction containing the inorganic salt or electrolyte with little, if any, organic solute; (d) a fraction containing electrolyte and rich in the second of the organic compounds to be eluted from the bed with the aqueous salt solution, followed by an aqueous fraction containing the electrolyte with little or no organic solute, and this fraction is followed by a fraction of the aqueous electrolyte solution rich in another of the organic compounds until each of the organic compounds has been eluted from the bed of the resin with the inorganic salt or electrolyte solution.

The accompanying drawings illustrate graphically the changes in composition of successive fractions of the effluent liquor collected during a single cycle of operations in each of several experiments which were carried out. The drawing will be referred to in greater detail in examples hereinafter presented, as to such experiments.

The above cycle of operations may be repeated many times, using the same bed of ion exchange resin and successive portions of the starting solution, to separate further amounts of the organic solutes from one another contained in the solution.

Two or more beds of an ion exchange resin may be advantageously employed in the process, with feed of a starting solution to one bed while flushing treated liquor and absorbed material from the other bed. By thus employing the beds in parallel with one another, and employing them alternately for the treatment of a starting solution, the process can be carried out in a continuous manner.

The method, as just described, may be applied in treating any of a wide variety of aqueous solutions each containing two or more non-ionized or slightly ionized water-soluble organic compounds to separate the organic compounds from one another. Examples of water-soluble organic compounds which can be separated from one another by the invention are lower aliphatic alcohols such as methyl alcohol, ethyl alcohol, n-propyl alcohol, isopropyl alcohol, tert.-butyl alcohol, formaldehyde, acetaldehyde, propionaldehyde, methylal, acetal, ethylene glycol, propylene glycol, diethylene glycol, triethylene glycol, dipropylene glycol, glycerine, methylamine, ethylamine, isopropylamine, n-propylamine, diethylamine, sec-butylamine, n-butylamine, monoethanolamine, or lignins, i.e. complex mixtures of water-soluble organic compounds obtained from the destructive distillation of wood and difficultly separable by usual fractional distillation methods. Mixtures of more than one class of the organic compounds can be separated by this technique, e.g. a mixture of an aldehyde, an alcohol and an amine.

The following examples illustrate certain ways in which the principle of the invention has been applied but are not to be construed as limiting its scope.

EXAMPLE 1

A glass tube was filled with granules of the sulphate salt form of a quaternary ammonium anion exchange resin (Dowex 1 x 4) consisting of particles of from 200–400 mesh size as determined by U.S. Standard screens, to form a bed of the resin 25.7 cm. long by 2.28 cm.$^2$ cross-sectional area. The tube was held in a vertical position and was filled with an aqueous 3-molar ammonium sulfate solution to the top level of the resin bed. One milliliter of an aqueous solution containing 0.1 millimole each of methanol, ethanol and propanol-1 was fed to the tube, thereby displacing an equal volume of liquid from the tube. Thereafter a 3-molar aqueous solution of ammonium sulfate was fed to the tube at a rate of about 1.1 ml. per minute. The liquid which was displaced from the tube was collected in 6 ml. portions and each portion was analyzed for alcohol. The procedure for analyzing the fraction was to mix the fraction with an equal volume of 0.1-normal sodium dichromate dissolved in concentrated (98 percent) sulfuric acid, then oxidize the alcohol and measure the absorbance of the resulting Cr(III), see Anal. Chim. Acta., vol. 14, p. 381 (1956). The first 50 ml. fraction of the effluent liquid was water containing ammonium sulfate. Starting with the ninth 6 ml. portion of the effluent liquid and continuing to the fifteenth 6 ml. portion, the fractions contained ammonium sulfate and methyl alcohol corresponding to concentrations (expressed as absorbance of Cr(III)) given in the following table. Starting with the fifteenth 6 ml. portion of the effluent liquid and continuing to the twenty-second 6 ml. portion the fractions contained ammonium sulfate and ethyl alcohol. Since propanol-1 was the only alcohol not eluted from the resin at this point in the experiment, the eluant was changed from 3-molar aqueous ammonium sulfate solution to water, beginning with the twenty-fourth 6 ml. portion, which water was fed to the bed at a rate of about 1.1 ml. per minute. Starting with the twenty-eighth 6 ml. portion of the effluent liquid and continuing through the thirty-third 6 ml. portion the fractions contained water and propanol-1 in amounts corresponding to concentrations given in Table I.

*Table I*

| Fraction No. | Volume total, ml. | Eluant solution and concentration | Absorbance value |
|---|---|---|---|
| 1–8 | 48 | 3-molar(NH₄)₂SO₄ | 0.000 |
| 9 | 54 | do | 0.002 |
| 10 | 60 | do | 0.009 |
| 11 | 66 | do | 0.196 |
| 12 | 72 | do | 0.630 |
| 13 | 78 | do | 0.363 |
| 14 | 84 | do | 0.059 |
| 15 | 90 | do | 0.024 |
| 16 | 96 | do | 0.104 |
| 17 | 102 | do | 0.377 |
| 18 | 108 | do | 0.552 |
| 19 | 114 | do | 0.351 |
| 20 | 120 | do | 0.102 |
| 21 | 126 | do | 0.021 |
| 22 | 132 | do | 0.003 |
| 23 | 138 | do | 0.000 |
| 24–27 | 144–162 | water | 0.000 |
| 28 | 168 | do | 0.003 |
| 29 | 174 | do | 0.042 |
| 30 | 180 | do | 0.149 |
| 31 | 186 | do | 0.591 |
| 32 | 192 | do | 0.216 |
| 33 | 198 | do | 0.054 |
| 34–35 | 204–210 | do | 0.000 |

FIG. 1 of the drawing is a graph showing the changes in concentration of the eluted alcohol in the effluent liquid and the fraction of the effluent liquid in which the respective alcohols were contained.

EXAMPLE 2

A glass tube of approximately two centimeters external diameter was filled with granules of a quaternary ammonium anion exchange resin in the sulfate form and consisting of beads of sizes between 200 and 400 mesh per inch as determined by U.S. Standard screens to form a bed of the resin 32 cm. deep having a cross-section area of 2.28 cm.² The tube was held vertically and was filled with an aqueous 4-molar ammonium sulfate solution to the top level of the resin bed. A charge of 2 ml. of an aqueous solution containing 0.1 millimole of each of the compounds glycerine, methyl alcohol, propylene glycol, ethyl alcohol, isopropyl alcohol, tertiary-butyl alcohol, sec-butyl alcohol and n-butyl alcohol, was fed to the tube, thereby displacing an equal volume of liquid from the tube. Thereafter, an aqueous 4-molar solution of ammonium sulfate was fed to the tube at a rate of about 1.1 ml. of the solution per minute. The liquid which was displaced from the tube was collected in 6 ml. portions and each of the portions was analyzed, employing procedure similar to that employed in Example 1. Table II identifies the fractions of the effluent liquid and gives the total volume of effluent liquid. The table also gives the concentration of the eluant ammonium sulfate solution and the concentration of the organic solute in the effluent liquid, expressed as absorbance of Cr(III).

*Table II*

| Fraction No. | Volume total, ml. | Eluant solution and concentration | Absorbance value |
|---|---|---|---|
| 1–8 | 48 | 4-molar(NH₄)₂SO₄ | 0.000 |
| 9 | 54 | do | 0.004 |
| 10 | 60 | do | 0.015 |
| 11 | 66 | do | 0.100 |
| 12 | 72 | do | 0.190 |
| 13 | 78 | do | 0.205 |
| 14 | 84 | do | 0.075 |
| 15 | 90 | do | 0.004 |
| 16 | 96 | do | 0.003 |
| 17 | 102 | do | 0.090 |
| 18 | 108 | do | 0.278 |
| 19 | 114 | do | 0.255 |
| 20 | 120 | do | 0.115 |
| 21 | 126 | do | 0.010 |
| 22 | 132 | do | 0.000 |
| 23 | 138 | do | 0.015 |
| 24 | 144 | 2.5-molar(NH₄)₂SO₄ | 0.045 |
| 25 | 150 | do | 0.082 |
| 26 | 156 | do | 0.134 |
| 27 | 162 | do | 0.130 |
| 28 | 168 | do | 0.090 |
| 29 | 174 | do | 0.060 |
| 30 | 180 | do | 0.022 |
| 31 | 186 | do | 0.007 |
| 32 | 192 | do | 0.000 |
| 33 | 198 | do | 0.007 |
| 34 | 204 | do | 0.045 |
| 35 | 210 | do | 0.095 |
| 36 | 216 | do | 0.095 |
| 37 | 222 | do | 0.045 |
| 38 | 228 | do | 0.005 |
| 39–47 | 234–282 | do | 0.000 |
| 48 | 288 | do | 0.017 |
| 49 | 294 | do | 0.040 |
| 50 | 300 | do | 0.078 |
| 51 | 306 | do | 0.098 |
| 52 | 312 | do | 0.102 |
| 53 | 318 | do | 0.085 |
| 54 | 324 | do | 0.055 |
| 55 | 330 | do | 0.020 |
| 56 | 336 | do | 0.007 |
| 57 | 342 | do | 0.002 |
| 58–63 | 348–378 | do | 0.000 |
| 64 | 384 | do | 0.005 |
| 65 | 390 | 2-molar(NH₄)₂SO₄ | 0.015 |
| 66 | 396 | do | 0.020 |
| 67 | 402 | do | 0.030 |
| 68 | 408 | do | 0.045 |
| 69 | 414 | do | 0.055 |
| 70 | 420 | do | 0.067 |
| 71 | 426 | do | 0.077 |
| 72 | 432 | do | 0.092 |
| 73 | 438 | do | 0.112 |
| 74 | 444 | do | 0.114 |
| 75 | 450 | do | 0.090 |
| 76 | 456 | do | 0.070 |
| 77 | 462 | do | 0.052 |
| 78 | 468 | do | 0.030 |
| 79 | 474 | do | 0.020 |
| 80 | 480 | do | 0.010 |
| 81 | 486 | do | 0.004 |
| 82–88 | 492–528 | do | 0.000 |
| 89 | 534 | do | 0.003 |
| 90 | 540 | do | 0.010 |
| 91 | 546 | do | 0.020 |
| 92 | 552 | do | 0.032 |
| 93 | 558 | do | 0.048 |
| 94 | 564 | do | 0.055 |
| 95 | 570 | do | 0.060 |
| 96 | 576 | do | 0.062 |
| 97 | 582 | do | 0.060 |
| 98 | 588 | do | 0.055 |
| 99 | 594 | do | 0.047 |
| 100 | 600 | do | 0.040 |
| 101 | 606 | do | 0.032 |
| 102 | 612 | do | 0.025 |
| 103 | 618 | 0.1-molar(NH₄)₂SO₄ | 0.015 |
| 104 | 524 | do | 0.010 |
| 105 | 630 | do | 0.005 |
| 106–107 | 636–642 | do | 0.000 |
| 108 | 648 | do | 0.002 |
| 109 | 654 | do | 0.005 |
| 110 | 660 | do | 0.020 |
| 111 | 666 | do | 0.070 |
| 112 | 672 | do | 0.170 |
| 113 | 678 | do | 0.200 |
| 114 | 684 | do | 0.150 |
| 115 | 690 | do | 0.075 |
| 116 | 696 | do | 0.003 |
| 117 | 702 | do | 0.020 |
| 118 | 708 | do | 0.007 |
| 119 | 714 | do | 0.003 |
| 120 | 720 | do | 0.000 |

Figure 2:
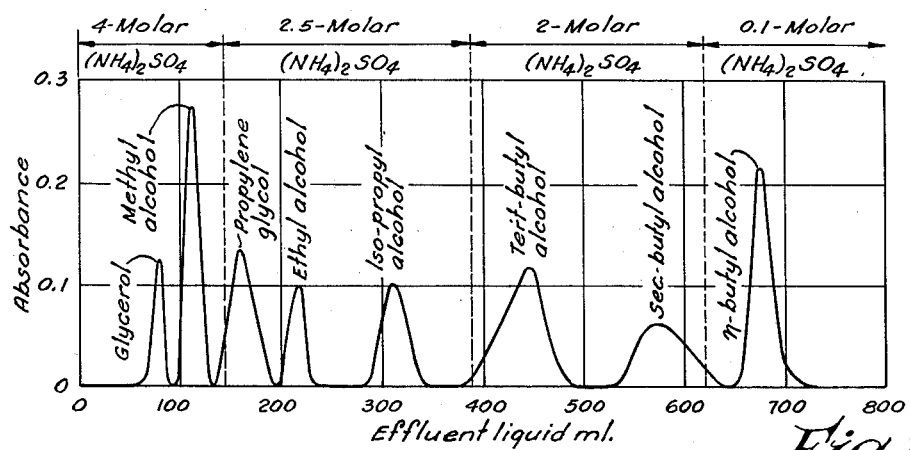

In the above table Fractions 9–15 contained the glycerine, Fractions 16–21 contained the methyl alcohol, Fractions 23–31 contained the propylene glycol, Fractions 33–38 contained the ethyl alcohol, Fractions 48–57 contained the isopropyl alcohol, Fractions 64–81 contained the tert.-butyl alcohol, Fractions 89–105 contained the sec-butyl alcohol and Fractions 108–119 contained the n- butyl alcohol. Fractions 1–8, 22, 32, 39–47, 58–63, 81–88, 106–107 and 120 were ammonium sulfate solution. FIG. 2 of the drawing is a graph showing the changes in concentration of the organic hydroxy compounds in the effluent liquid and the portion of the same in which they are contained.

EXAMPLE 3

Figure 3:
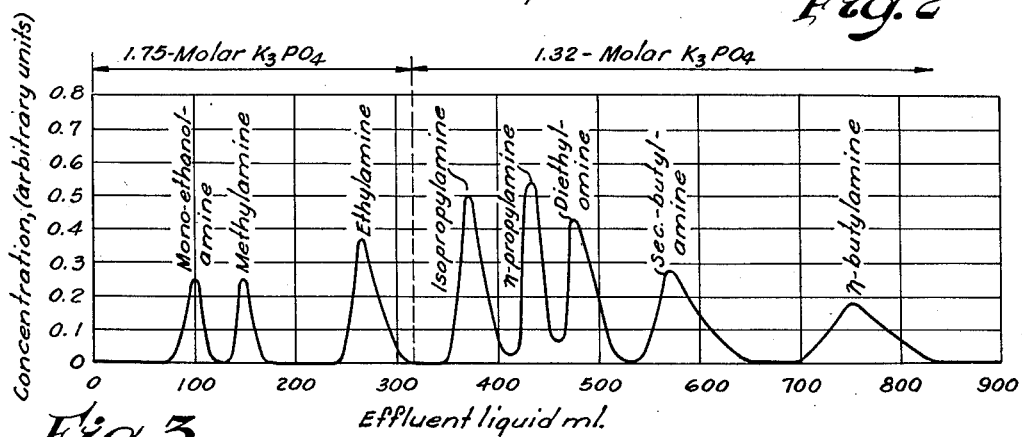

A glass tube was filled with granules of a cation exchange resin (Dowex 50–X4) consisting of particles of from 200–400 mesh size as determined by U.S. Standard screens, to form a bed of the resin 9.7 cm. deep by 3.9 cm.$^2$ cross-sectional area. The cation exchange resin was an insoluble sulfonated vinyl aromatic polymer. The bed of the resin was washed with an aqueous 1.75 molar potassium phosphate ($K_3PO_4$) solution to convert the resin to the potassium form. The tube was held in a vertical position and was filled with a 1.75 molar potassium phosphate solution to the top level of the resin bed. Three milliliters of an aqueous solution containing 0.1 millimole each of monoethanolamine, methylamine, ethylamine, isopropylamine, n-propylamine, diethylamine, sec-butylamine and n-butylamine, was fed to the tube, thereby displacing an equal volume of liquid from the tube. Thereafter, an aqueous solution of potassium phosphate in concentration as stated in the following table was fed to the tube at a rate of about 1.1 ml. per minute. The liquid which was displaced from the tube was collected in 6 ml. portions and each portion was analyzed. The first 72 ml. of the effluent liquid was water containing potassium phosphate. Starting with Fraction 13 and continuing to Fraction 20 of the 6 ml. portions of the effluent liquid, the fractions contained potassium phosphate and monoethanolamine as the sole solutes, the monoethanolamine being in concentrations as given in the following table. Starting with Fraction 22 and continuing to Fraction 28, the effluent liquid contained methylamine as the sole organic solute, in concentrations as expressed in the table. Fractions 29–40 were water containing the potassium phosphate. Fractions 41–52 contained ethylamine. Beginning with Fraction 53 the eluant feed solution was changed from 1.75 molar to 1.32 molar aqueous potassium phosphate solution. Fractions 53–58 were water containing said potassium phosphate. Fractions 59–68 contained substantially all of the isopropylamine. Fractions 69–76 contained principally n-propylamine. Fractions 77–87 contained diethylamine. Fractions 88–89 were water containing potassium phosphate. Fractions 90–108 contained sec-butylamine. Fractions 109–116 were water containing potassium phosphate. Fractions 117–138 contained n-butylamine. Fraction 139 was water containing potassium phosphate. FIG. 3 of the drawing is a graph based on the data in Table III.

*Table III*

| Fraction No. | Volume total, ml. | Eluant solution and concentration | Concentration (arbitrary units) |
|---|---|---|---|
| 1–12 | 72 | 1.75 molar $K_3PO_4$ | 0.000 |
| 13 | 78 | do | 0.010 |
| 14 | 84 | do | 0.030 |
| 15 | 90 | do | 0.095 |
| 16 | 96 | do | 0.230 |
| 17 | 102 | do | 0.250 |
| 18 | 108 | do | 0.080 |
| 19 | 114 | do | 0.020 |
| 20 | 120 | do | 0.003 |
| 21 | 126 | do | 0.000 |
| 22 | 132 | do | 0.003 |
| 23 | 138 | do | 0.018 |
| 24 | 144 | do | 0.150 |
| 25 | 150 | do | 0.200 |
| 26 | 156 | do | 0.070 |
| 27 | 162 | do | 0.020 |
| 28 | 168 | do | 0.002 |
| 29–40 | 174–240 | do | 0.000 |
| 41 | 246 | do | 0.004 |
| 42 | 252 | do | 0.020 |
| 43 | 258 | do | 0.130 |
| 44 | 264 | do | 0.340 |
| 45 | 270 | do | 0.370 |
| 46 | 276 | do | 0.230 |
| 47 | 282 | 1.75 molar $K_3PO_4$ | 0.140 |
| 48 | 288 | do | 0.058 |
| 49 | 294 | do | 0.039 |
| 50 | 300 | do | 0.020 |
| 51 | 306 | do | 0.005 |
| 52 | 312 | do | 0.002 |
| 53–58 | 318–348 | 1.32 molar $K_3PO_4$ | 0.000 |
| 59 | 354 | do | 0.003 |
| 60 | 360 | do | 0.039 |
| 61 | 366 | do | 0.150 |
| 62 | 372 | do | 0.480 |
| 63 | 378 | do | 0.460 |
| 64 | 384 | do | 0.310 |
| 65 | 390 | do | 0.170 |
| 66 | 396 | do | 0.080 |
| 67 | 402 | do | 0.035 |
| 68 | 408 | do | 0.012 |
| 69 | 414 | do | 0.017 |
| 70 | 420 | do | 0.159 |
| 71 | 426 | do | 0.500 |
| 72 | 432 | do | 0.623 |
| 73 | 438 | do | 0.470 |
| 74 | 444 | do | 0.279 |
| 75 | 450 | do | 0.100 |
| 76 | 456 | do | 0.065 |
| 77 | 462 | do | 0.065 |
| 78 | 468 | do | 0.190 |
| 79 | 474 | do | 0.400 |
| 80 | 480 | do | 0.430 |
| 81 | 486 | do | 0.400 |
| 82 | 492 | do | 0.330 |
| 83 | 498 | do | 0.190 |
| 84 | 504 | do | 0.110 |
| 85 | 510 | do | 0.050 |
| 86 | 516 | do | 0.030 |
| 87 | 522 | do | 0.011 |
| 88–89 | 528–534 | do | 0.000 |
| 90 | 540 | do | 0.004 |
| 91 | 546 | do | 0.010 |
| 92 | 552 | do | 0.035 |
| 93 | 558 | do | 0.140 |
| 94 | 564 | do | 0.230 |
| 95 | 570 | do | 0.270 |
| 96 | 576 | do | 0.268 |
| 97 | 582 | do | 0.245 |
| 98 | 588 | do | 0.200 |
| 99 | 594 | do | 0.165 |
| 100 | 600 | do | 0.135 |
| 101 | 606 | do | 0.110 |
| 102 | 612 | do | 0.085 |
| 103 | 618 | do | 0.060 |
| 104 | 624 | do | 0.050 |
| 105 | 630 | do | 0.037 |
| 106 | 636 | do | 0.025 |
| 107 | 642 | do | 0.015 |
| 108 | 648 | do | 0.005 |
| 109–116 | 654–696 | do | 0.000 |
| 117 | 702 | do | 0.004 |
| 118 | 708 | do | 0.013 |
| 119 | 714 | do | 0.025 |
| 120 | 720 | do | 0.040 |
| 121 | 726 | do | 0.063 |
| 122 | 732 | do | 0.083 |
| 123 | 738 | do | 0.100 |
| 124 | 744 | do | 0.155 |
| 125 | 750 | do | 0.170 |
| 126 | 756 | do | 0.170 |
| 127 | 762 | do | 0.150 |
| 128 | 768 | do | 0.135 |
| 129 | 774 | do | 0.120 |
| 130 | 780 | do | 0.104 |
| 131 | 786 | do | 0.090 |
| 132 | 792 | do | 0.070 |
| 133 | 798 | do | 0.055 |
| 134 | 804 | do | 0.045 |
| 135 | 810 | do | 0.037 |
| 136 | 816 | do | 0.024 |
| 137 | 822 | do | 0.013 |
| 138 | 828 | do | 0.004 |
| 139 | 834 | do | 0.000 |

EXAMPLE 4

A glass tube was filled with granules of the borate form of a quaternary ammonium anion exchange resin (Dowex 1X4) consisting of particles of from 200–400 mesh size as determined by U.S. Standard screens to form a bed of the resin 22.3 cm. deep by 3.9 cm.$^2$ cross-sectional area. The tube was filled with a 1.6-molar solution of sodium borate to the top level of the resin bed. A charge of one milliliter of water containing 0.050 gram each of diethylene glycol and dipropylene glycol as solutes was fed to the tube, thereby displacing an equal amount of liquid from the tube. Thereafter, a 1.6 molar aqueous solution of sodium borate ($NaBO_2$) was fed to the tube at a rate of about 1.1 ml. per minute. The liquid which was displaced from the tube was collected in 6 ml. portions and each portion was analyzed, employing procedure similar to that employed in Example 1. All of the diethylene glycol was eluted from the resin and was collected in the first 110 ml. of the effluent liquid. All of the dipropylene glycol was eluted and collected in the following 200 ml. of effluent liquid displaced from the bed of the resin.

We claim:

1. A method of separating from one another a mixture of at least two water-soluble weakly-ionized to non-ionized organic compounds capable of being absorbed by an ion exchange resin and subsequently washed from the resin with an aqueous solution, which method comprises, feeding to a bed of an ion exchange resin immersed in an aqueous liquid solution of an inorganic salt which is inert to the organic compounds and in a concentration between that of a 0.1 molar and a saturated solution, an aqueous solution of at least two water-soluble weakly-ionized to non-ionized organic compounds which are non-reactive with said ion exchange resin, thereby causing the organic compounds to be selectively absorbed by said resin in amounts different from one another, and thus displacing from the bed of the resin an equal volume of effluent liquid, then feeding to the bed an aqueous solution of said inorganic salt in a concentration between that of 0.1 molar and a saturated solution to displace a further amount of liquid from the bed and elute the organic compounds from the resin, and collecting successive fractions of the displaced effluent liquid, whereby there is obtained a fraction of the effluent liquid containing a major portion of a single organic compound as the sole organic solute and a subsequent fraction of the effluent liquid containing a major portion of another of the organic compounds as the sole organic solute, until all of the organic compounds are eluted from the bed of the resin and collected in separate fractions of the displaced effluent liquid.

2. A method wherein the steps described in claim 1 are repeated using a further amount of the starting solution and the same bed of the resin.

3. A method as described in claim 1, wherein the ion exchange resin is a cation exchange resin having an acidic form which is ionized to an extent such that the addition of a 10 gram portion thereof to 100 cubic centimeters of a 0.1 normal aqueous sodium chloride solution brings the latter to a pH value of less than 3.

4. A method as described in claim 1, wherein the ion exchange resin is an anion exchange resin having a basic form which is ionized to an extent such that the addition of a 10 gram portion thereof to 100 cubic centimeters of a 0.1 normal aqueous sodium chloride solution brings the latter to a pH value greater than 11.

5. A method as claimed in claim 1, wherein the ion exchange resin is a nuclear sulfonated copolymer of a major proportion of at least one polymerizable monoalkenyl aromatic hydrocarbon and a minor amount of divinylbenzene.

6. A method as described in claim 1, wherein the ion exchange resin is the reaction product of an insoluble copolymer of a major proportion of at least one monovinyl aromatic compound and a minor amount of divinylbenzene, said copolymer containing chloromethyl groups on aromatic nuclei of the copolymer and a tertiary amine.

7. A method as described in claim 1, wherein the ion exchange resin is the reaction product of an insoluble copolymer of a predominant amount of styrene and minor amounts of ar-ethylvinylbenzene and divinylbenzene, said copolymer containing chloromethyl groups on aromatic nuclei of the copolymer, with trimethylamine, the organic solutes are aliphatic hydroxy compounds and the inorganic salt is ammonium sulfate.

8. A method as described in claim 1, wherein the ion exchange resin is an alkali metal salt form of a nuclear sulfonated insoluble copolymer of a major proportion of styrene and minor amounts of ar-ethylvinylbenzene and divinylbenzene, the organic solutes are aliphatic amines and the inorganic salt is potassium phosphate.

9. A method of separating water-soluble aliphatic alcohols from one another which comprises feeding to a bed of an ion exchange resin immersed in an aqueous liquid solution of ammonium sulfate in a concentration between a 0.1 and a 4 molar solution, an aqueous solution of at least two water-soluble lower aliphatic alcohols which are non-reactive with said ion exchange resin, thereby causing the alcohols to be selectively absorbed by said resin in amounts different from one another, and thus displacing from the bed of the resin an equal volume of effluent liquid, then feeding to the bed an aqueous solution of ammonium sulfate in a concentration between a 0.1 and 4 normal solution and thereby displacing a further quantity of liquid from the bed and collecting fractions of the displaced liquid containing the separated alcohols.

10. A method of separating water-soluble aliphatic amines from one another which comprises feeding to a bed of an ion exchange resin immersed in an aqueous liquid solution of potassium phosphate in a concentration between a 0.1 and a 4 molar solution, an aqueous solution of at least two water-soluble aliphatic amines which are non-reactive with said ion exchange resin, thereby causing the amines to be selectively absorbed by said resin in amounts different from one another and thus displacing from the bed of the resin an equal volume of effluent liquid, then feeding to the bed an aqueous solution of potassium phosphate in a concentration between a 0.1 and 4 molar solution and thereby displacing a further quantity of liquid from the bed and collecting fractions of the displaced liquid containing the separated amines.

References Cited in the file of this patent

UNITED STATES PATENTS

| | | |
|---|---|---|
| 2,366,007 | D'Alelio | Dec. 26, 1944 |
| 2,591,573 | Burney | Apr. 1, 1952 |
| 2,678,132 | Beard | May 11, 1954 |
| 2,684,331 | Bauman | July 20, 1954 |
| 2,771,193 | Simpson et al. | Nov. 20, 1956 |
| 2,911,362 | Wheaton | Nov. 3, 1959 |

OTHER REFERENCES

"Chromatographic Analysis," Faraday, Soc. Disc., No. 7, Gurney and Jackson, London, 1949, pp. 275–285 and pp. 296–305.

Wheaton et al.: "Annals of N.Y. Acad. of Sci.," vol. 57, pp. 159–176, Nov. 11, 1953.

"Ion Exchange Chromatograph in Alcohol," Nature, vol. 176, pp. 398–400, Aug. 27, 1955.

Elliot: "Protein Separation," Combustion, vol. 28, No. 1, July 1956, pp. 59 and 60.

Reichenberg: "Chem. and Ind.," pp. 958–959, Sept. 15, 1956.

Nachod et al.: "Ion Exchange Technology," pp. 187–189, 1956.